Figures 1, 2:
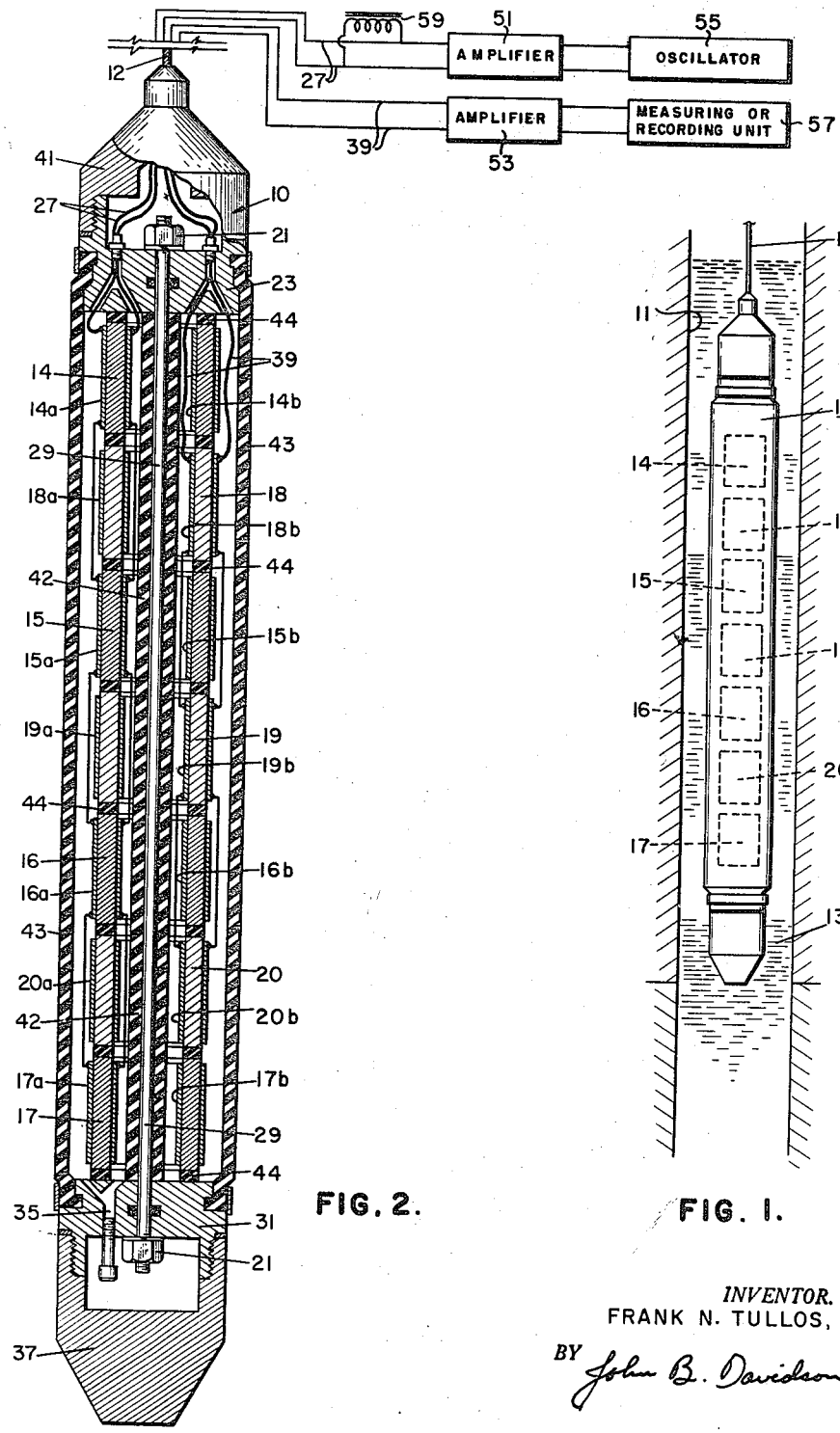

Jan. 13, 1959

F. N. TULLOS 2,868,311

ACOUSTIC IMPEDANCE LOGGING

Filed March 7, 1957

INVENTOR.
FRANK N. TULLOS,

BY John B. Davidson

ATTORNEY.

2,868,311
ACOUSTIC IMPEDANCE LOGGING

Frank N. Tullos, Houston, Tex., assignor, by mesne assignments, to Jersey Production Research Company, Tulsa, Okla., a corporation of Delaware Application March 7, 1957, Serial No. 644,652

3 Claims. (Cl. 181—.5)

This application is a continuation-in-part of application Serial No. 555,630, filed December 27, 1955, now abandoned, by Frank N. Tullos for "Acoustic Impedance Logging."

This invention relates to a method and apparatus for carrying out acoustic impedance measurements in subsurface formations. More particularly, this invention relates to a new and novel method and apparatus for emphasizing the effects of radial components of generated acoustic waves while minimizing the effects of longitudinal components of the generated acoustic waves.

In acoustic impedance well logging, it is necessary, in order to determine the acoustic impedance of subsurface formations traversed by the logging device, that the acoustic energy emitted from the sound source be transmitted substantially radially with respect to the logging device. Unlike other types of logging methods, such as velocity logging, any longitudinal waves generated by the sound source are undesirable and should be eliminated as much as possible in order to obtain more reliable records. The reason for this is that longitudinal waves often result in objectionable standing waves in the borehole. Detected standing waves which appear on the record cause the detected radial waves (the radial waves being the waves which are utilized to determine the acoustic impedance of subsurface formations) to be more difficult to interpret.

One ultimate aim of acoustic impedance logging researchers is to provide an instrument which does not produce longitudinal waves, or which, in some manner, minimizes the unwanted longitudinal waves. Many expedients have been devised which, to some extent, minimize the unwanted longitudinal waves while emphasizing the desired radial waves.

One expedient, previously tried, was to include in the logging device materials which absorb the longitudinal waves. Examples of such materials are lead pellets, lead wool and powdered lead in rubber. A second expediency is to utilize a sound source which emits primarily radial waves without emitting an objectionable amount of longitudinal waves. For example, one type of sound source which has been found satisfactory consists of a barium titanate crystal which has piezo-electric properties.

It has been found that longitudinal waves within a borehole combine to form a standing wave within the borehole. The longitudinal waves, after being generated and transmitted past the logging device, reflect at acoustic boundaries (including the top and bottom of the borehole) and effectively reverberate up and down within the borehole to form the standing wave.

It has been discovered that the detecting instruments utilized in acoustic impedance logging can be positioned within the housing so as to achieve the substantial cancellation of the effect of the standing wave, while at the same time emphasizing the desired radial components. Broadly speaking, therefore, this new method and system for acoustic impedance logging encompasses, in its inventive concept, the proper location of a plurality of detecting devices so as to achieve the substantial cancellation of the unwanted standing waves. Each of the detecting devices is spaced from each of the other detecting devices. The spacing provides that the magnitude and polarity of the signal generated by each detector as a result of the standing wave is such that the sum of the signals is substantially zero.

This new method and system for emphasizing the radial waves to the substantial exclusion of standing waves may be utilized in conjunction with any type of acoustic impedance logging device including those logging devices which include, as a part thereof, an absorbing material and/or a sound source which emits substantially radial waves.

Other objects and a fuller understanding of the invention may be had by referring to the following description and claims, taken in conjunction with the accompanying drawings in which:

Fig. 1 is a vertical elevational schematic view showing the relative positions of the plurality of detectors and sound sources utilized in carrying out my new acoustic impedance logging method; and Fig. 2 is an elevational sectional view showing one type of sound source which may be utilized in carrying out my new method.

As shown in Fig. 1, a housing 10 is lowered into a borehole 11 by means of a cable 12. The borehole 11 is usually filled with a drilling mud 13. Located within the housing 10, as shown schematically in Fig. 1, are a plurality of sound sources 14, 15, 16 and 17. Also located within the housing 10 are a plurality of detectors 18, 19 and 20. As heretofore stated, it is desirable that the waves emitted from the sound sources 14, 15, 16 and 17 be emitted substantially radially and that these waves be detected by pickups 18, 19 and 20 upon reflection from the formation surrounding the borehole. For this reason each of the detectors 18 through 20, inclusive, is located between two sound sources. Therefore, sound sources 14 and 17 are located at the upper and lower extremities, respectively, of housing 10, detector 18 between sound sources 14 and 15, detector 19 between sound sources 15 and 16, and detector 20 between sound sources 16 and 17. The sound sources 14 to 17, inclusive, are electrically connected together so that an oscillating electrical signal, transmitted to the sound sources through cable 12, causes the several sound sources to generate simultaneously sound waves having the same frequency as the frequency of the oscillating electrical signal. In this manner all of the sound sources act as though they were a single sound source emitting waves having both radial components and longitudinal components.

The proper spacing of the plurality of detectors depends upon the frequency of the electrical signals transmitted to the sound sources and the velocity of the longitudinal waves through the medium contained within the borehole. Usually drilling mud is contained within the borehole and the velocity of sound through the drilling mud is substantially constant. The spacing between each detector is related to the particular frequency of the generated sound waves according to the formula $$V = fNs$$

where V is the velocity of the longitudinal components in feet per second, $s$ is the distance between adjacent detectors in feet, $f$ is the frequency of the generated sound waves in cycles per second, and N is the number of detectors. As an example, if three detectors are to be used, then it is desirable that the spacing between adjacent detectors be one-third of the wave length of the longitudinal standing wave. With this spacing, the voltages generated by the three detectors due to the longitudinal standing waves in the borehole will be of such magnitude and polarities that they will tend to cancel upon addition in the detectors; and therefore, the signal generated to the surface of the earth and recorded, corresponding to the longitudinal standing waves, is minimized. To carry this example further, if the velocity of the sound waves in the drilling mud is 4200 feet per second and if the frequency of the generated sound waves is 620 cycles per second, then the physical spacing "s" between adjacent detectors will be 2.26 feet or about 27 inches. However, the radial waves which are propagated radially from the housing 10 and reflected from the subsurface formations are in phase when they impinge upon the detectors 18, 19 and 20. Hence, the electric signals generated and recorded, due to the radial waves impinging upon the pickups, are reinforced and the ratio $$\frac{\text{Voltage due to radial waves}}{\text{Voltage due to longitudinal standing waves}}$$

is maximized thereby causing the record to be easily interpreted.

It is to be noted that, while the deleterious effects of the standing wave within the borehole are overcome by this invention, the longitudinally transmitted waves from the transmitters will be detected before they pass beyond the logging device and will not be suppressed in the output circuit inasmuch as they do not appear to the receivers as coming from a point source. The effects of the standing wave that is later produced have been found to be far more serious than the effects of the originally longitudinal transmitted waves, and it is to the suppression of the effects of this standing wave that this invention is directed.

The reason that the effect of the original longitudinally transmitted waves is not particularly detrimental is thought to be as follows. The radially transmitted waves set up an acoustic pressure within the borehole in the immediate vicinity of the logger. This pressure is a function of the acoustic impedance being measured and further determines the amplitude of the longitudinal waves from the transmitting transducers. Therefore, the signals produced by the longitudinal waves before they pass beyond the extremities of the logger will be functionally related to the acoustic impedance being measured and hence, are not objectionable.

Although three detectors are shown in the schematic showing of Fig. 1, it is to be understood that either two detectors or more than three detectors may be utilized in my new method and system, the only requirement being that they be so spaced so as to cancel out the unwanted longitudinal standing waves, the proper spacing being determined by the frequency of the sound waves generated from the sound sources and the velocity of the longitudinal waves through the medium within the borehole, using the above formula.

The apparatus shown in Fig. 1 is pictured in greater detail in Fig. 2 along with certain control and measuring apparatus associated therewith. The apparatus is similar in many respects to the apparatus shown and described in copending application Serial No. 466,164 for "Acoustic and Logging Apparatus" by Frank N. Tullos et al. filed November 1, 1954, and assigned to the assignee of the present invention. As shown, the apparatus comprises a plurality of cylindrically shaped piezo-electrical transmitter elements 14, 15, 16 and 17 and a plurality of cylindrically shaped piezo-electric receiver elements 18, 19 and 20. The piezo-electric elements are preferably barium titanate crystals. Each of the piezo-electric elements is coated with a conducting film on the exterior surface thereof (designated by the numerals 14a through 20a) and a conductive film on the interior surface thereof (designated by the reference numerals 14b through 20b). The crystals are assembled end to end and separated from each other and from end plates 23 and 31 by means of electrical insulating members 44. The piezo-electrical elements are supported by the end plates which are connected together by a centrally located supporting rod 29 at the ends thereof, the end plates being screwed on the ends of the supporting rods by compression nuts 21. Surrounding the supporting rod 29 between the end plates and within the structure defined by the piezo-electric members is an inside column 42 made of a mixture of powdered lead and rubber, which substance is a high absorber of underwater sound. The function of this material is to damp out any resonance within the column.

Surrounding the piezo-electric members and enveloping them in conjunction with the end plates is a flexible housing 43, preferably made of rubber, which is designed so as to form a fluid tight seal with the end plates for the purpose of preventing the escape of di-electric fluid within the structure. End bells 37 and 41 screw-threadedly engage end plates 31 and 23, respectively, to complete the structure. Filling port 35 within end plate 21 and another filling port (not shown) within end plate 23 are provided for the purpose of filling the space between the di-electric members and the flexible housing 43 and the space between inner column 42 and the piezo-electric members with a di-electric fluid. The function of the fluid is to transmit elastic waves impinging on the flexible housing to and from the piezo-electric members.

For the purpose of exciting and driving the transmitters 14, 15, 16 and 17, there is provided a voltage regulated and frequency stabilized variable frequency oscillator 55 in conjunction with a power amplifier 51 and a matching impedance 59, which is connected by leads 27 to the conductive films 14a and 14b on the outer and inner surfaces of piezoelectric transmitter 14. The conductive films on the inner and outer surfaces of transmitter surface 14 are respectively connected to the conductive films on the inner and outer surfaces of the other members so that the conductive members are effective excited in parallel so as to vibrate in phase and at the same frequency, the frequency being the output frequency of oscillator 55. The reason for making the frequency of oscillator 55 variable is to compensate for possible variations in the velocity of sound through the borehole so that the receiver members will be the desired fraction of a wave length apart at the frequency of the sound waves. In this manner it is unnecessary to provide means for adjusting the distance between the receiver members as would be necessary if the oscillator were of constant frequency. Note, however, that it is very important that the frequency generated by the oscillator be very stable.

Output indications from the piezo-electric receivers 18, 19 and 20 are coupled to a measuring or recording unit 57, such as a vacuum tube voltmeter or a magnetic tape recorder, through an amplifier 53. The amplifier is connected directly to the conductive films on the inner and outer surfaces of receiver member 18 by means of a pair of electrical leads 39. As shown in the drawings, the conductive films are connected together so that the outputs of the piezo-electric members are effectively in parallel. This, however, is not necessary as it has been found that the receiver members may be connected in series to add the output signals produced thereby; however, in order to get necessary electrostatic shielding with minimum difficulty, it is preferable to use the parallel connection. It is to be re-emphasized that the same cancellation effect is produced by either type connection of the output circuits of the receiver members.

For other details of the construction of the apparatus described with reference to Fig. 2, reference is made to the aforementioned patent application Serial No. 466,164. It is to be noted that while the relative size of the transmitter transducer members and receiver transducer members shown in Fig. 2 are shown to be the same, this is not necessarily the most desirable construction. For many applications it has been found that the receiver members may be much smaller in length than the transmitter members, a typical ratio of transmitter length to receiver length being 8:1.

Although the invention has been described with a certain degree of particularity, it is understood that the present disclosure has been made only by way of example and that numerous changes in the method and in the details of construction and the combination and arrangement of parts may be resorted to without departing from the spirit and scope of the invention as hereinafter claimed.

What is claimed as new and useful is:

1. In an acoustic impedance logging system for logging a borehole: means for generating sound waves of a particular frequency and having radial components and longitudinal components; and a plurality of spaced apart detectors; the spacing between adjacent detectors being related to the particular frequency of the generated sound waves according to the formula $$V = fNs$$

wherein V is the expected velocity of the longitudinal components in the borehole, $s$ is the distance between adjacent detectors, $f$ is the frequency of the generated sound waves, and N is the number of said detectors.

2. In an acoustic impedance logging system for use in a borehole drilled in the earth: sound generating means for generating sound waves of a particular frequency and having radial components and longitudinal components; a plurality of spaced apart detectors for generating electrical signals responsive to sound waves impinging thereon; said detectors being connected together so that said output signals are additive; the spacing between adjacent detectors being related to the frequency of the generated sound waves according to the formula $$V = fNs$$

where V is the expected velocity of the longitudinal components in the borehole, $s$ is the distance between adjacent detectors, $f$ is the frequency of the generated sound waves, and N is the number of said detectors.

3. In an acoustic impedance logging system for logging a borehole: a plurality of spaced apart sound generating means for generating in-phase sound waves of the same given frequency, said sound waves having radial components and longitudinal components; a plurality of sound detector means for generating electrical signals in accordance with sound waves detected thereby, one of said detector means being positioned between each pair of said sound generating means, the spacing between adjacent detectors being related to the frequency of the generated sound waves according to the formula $$V = fNs$$

where V is the expected velocity of the longitudinal components in the borehole, $s$ is the distance between adjacent detectors, $f$ is the frequency of the generated sound waves, and N is the number of detectors.

References Cited in the file of this patent

UNITED STATES PATENTS 2,207,281   Athy et al. _____ July 9, 1940